(12) United States Patent
Yuan et al.

(10) Patent No.: US 7,885,352 B2
(45) Date of Patent: Feb. 8, 2011

(54) METHOD AND DEVICE FOR DETERMINING TRANSMIT POWER SPECTRAL DENSITY

(75) Inventors: Jun Yuan, Shenzhen (CN); Wei Yu, Toronto (CA); Liming Fang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 613 days.

(21) Appl. No.: 11/944,985

(22) Filed: Nov. 26, 2007

(65) Prior Publication Data

US 2008/0123725 A1    May 29, 2008

(30) Foreign Application Priority Data

Nov. 27, 2006    (CN)    .................. 2006 1 0149048

(51) Int. Cl.
*H04K 1/02* (2006.01)
(52) U.S. Cl. ..................................... 375/296
(58) Field of Classification Search ............... 375/285, 375/296
See application file for complete search history.

(56) References Cited

U.S. PATENT DOCUMENTS

2003/0099285 A1* 5/2003 Graziano et al. ............ 375/220

OTHER PUBLICATIONS

Lui et al., "Low-Complexity Near-Optimal Spectrum Balancing for Digital Subscriber Lines," *IEEE International Conference*, 3:1947-1951 (2005).
Yu et al., "Dual Methods for Nonconvex Spectrum Optimization of Multicarrier Systems," *IEEE Transactions on Communications*, 54(7):1310-1322 (2006).
Yu et al., "Multiuser Discrete Bit-Loading for Digital Subscriber Lines," *IEEE International Conference*, pp. 2755-2760 (2007).
European Search Report for Application No. EP07121656, dated Jul. 22, 2008.
Office action issued in corresponding European patent application No. 07121656.8, dated Aug. 9, 2010; total 3 pages.

* cited by examiner

*Primary Examiner*—Kevin Y Kim

(57) ABSTRACT

A method for determining transmit power spectral density (PSD), includes: calculating time sharing parameters corresponding to transmission patterns for all users in each frequency band; and determining transmit PSD according to the transmission patterns and the time sharing parameters. A device for determining a transmit PSD including a calculation module and a PSD determining module is disclosed as well. Using the solution, the time for determining the transmit PSD can be saved.

15 Claims, 2 Drawing Sheets

```
                    ┌─ 101
┌─────────────────────────────────────────────┐
│ time sharing parameters corresponding to    │
│ transmission patterns for all users in each │
│ frequency band are calculated               │
└─────────────────────────────────────────────┘
                    │
                    ▼       ┌─ 102
┌─────────────────────────────────────────────┐
│ transmit PSD is determined according to the │
│ transmission patterns and the time sharing  │
│ parameters                                  │
└─────────────────────────────────────────────┘
```

| Sub frequency band | 01 | 02 | 03 | 04 | 05 | 06 | 07 | 08 | 09 | 10 | 11 | 12 | 13 | 14 | 15 | 16 | 17 | 18 |
|---|---|---|---|---|---|---|---|---|---|---|---|---|---|---|---|---|---|---|
| | | | | Group 1 | | | | | | | | | Group 2 | | | | | |
| User 1 | 01 | 02 | 03 | 04 | 05 | 06 | 07 | 08 | 09 | 10 | 11 | 12 | | | | | | |
| User 2 | 01 | 02 | 03 | 04 | 05 | 06 | 07 | 08 | 09 | | | | 13 | 14 | 15 | | | |
| User 3 | 01 | 02 | 03 | 04 | 05 | 06 | 07 | 08 | 09 | | | | | | | 16 | 17 | 18 |

METHOD AND DEVICE FOR DETERMINING TRANSMIT POWER SPECTRAL DENSITY

BACKGROUND OF THE INVENTION

1. Field of the Invention

The present invention relates to communication technologies, and more particularly, to a method and device for determining transmit power spectral density (PSD).

2. Background of the Invention

In Digital Subscriber Line (DSL) technology, subscriber cables always contain multiple (25 or more) twisted pair wires. Various services may operate in different twisted pair wires. When Various Subscriber Digital Lines (xDSL) operate simultaneously, crosstalk may occur, which may result in performance loss of some of the lines.

With the boost in the frequency baud that the xDSL technology uses, crosstalk, especially crosstalk in high frequency has become more and more obvious. Because in upstream and downstream directions of the xDSL, frequency division multiplex method is used, near-end crosstalk (NEXT) may not bring too large performance loss, but the far-end crosstalk (FEXT) will bring very large performance loss in the line. If there are multiple lines use XDSL service in a bundle of cables simultaneously, the FEXT may result in that the rates of some of the lines are low, the performance of some of the lines is unsteady, or even some of the lines cannot be activated, etc. As a result, the service penetration rate of the Digital Subscriber Line Access Multiplexer (DSLAM) is low.

In a communication model, there are K users adopting Discrete Multi-tone (DMT) and N sub frequency bands (tones), the signal transmitted in each tone may be separately expressed by:

$$y_n = H_n x_n + \sigma \quad \text{Equation 1}$$

In general, the receiver of each xDSL user regards the interferences from other users, i.e., the crosstalk, as noise. Accordingly, the data rate that the $k^{th}$ user may achieve in the $n^{th}$ sub frequency band, $b_n^k$, is given by the Shannon's channel capacity equation:

$$b_n^k = \log_2\left(1 + \frac{G_n^{kk} S_n^k}{\sum_{j \neq k} G_n^{kj} S_n^j + \sigma^2}\right) \quad \text{Equation 2}$$

As can be seen in Equation 2, the crosstalk lowers the transmission capacity of the line badly, in other words, the crosstalk reduces the rate of the line.

Dynamic Spectral Management (DSM) may automatically adjust the transmit PSD of each user in a network for crosstalk Avoidance.

DSM provides spectrum optimization problems as follows.

Spectrum optimization problem I is that the weighted sum of the rates of all users are maximized by adjusting the transmit power of each user in each sub frequency band (tone) subject to that the total power of each user does not exceed a limitation. The mathematic description of this problem is as follows.

$$\text{Maximize} \sum_{k=1}^{K} \omega_k \sum_{n=1}^{N} b_n^k \quad \text{Equation group 1}$$

$$\text{Subject to } b_n^k = \log_2\left(1 + \frac{G_n^{kk} S_n^k}{\sum_{j \neq k} G_n^{kj} S_n^j + \sigma^2}\right)$$

$$\text{Subject to } \sum_{n=1}^{N} S_n^k \leq P^k, \forall k$$

$$0 \leq S_n^k \quad \forall k, n$$

where $S_n^k$ is the power allocated for the $k^{th}$ user in the $n^{th}$ sub frequency band;

$G_n^{kk}$ is a transmission coefficient of the $k^{th}$ user in the $n^{th}$ sub frequency band;

$G_n^{kj}$ ($j \neq k$) is a crosstalk coefficient of the $j^{th}$ user to the $k^{th}$ user in the $n^{th}$ sub frequency band;

$p^k$ is a limitation on the total power of the $k^{th}$ user;

$\omega_k$ is a weight coefficient of rate of the $k^{th}$ user;

$\sigma^2$ is power of noise;

N is the total number of the sub frequency bands;

K is the total number of the users.

Spectrum optimization problem II is that the rate of a new user, $R_1$, is maximized subject to that the total transmit power of each user does not exceed the limitation and the target rates of the existing users, $R_k$, k=2, . . . , K, are guaranteed. The mathematic descriptions of this problem are as follows.

$$\text{Maximize } R_1 \quad \text{Equation group 2}$$

$$\text{subject to } R_k \geq R_{target,k}, \quad k \neq 1$$

$$R_1 = \sum_{n=1}^{N} \log\left(1 + \frac{G_n^{11} S_n^1}{\sum_{j \neq 1} G_n^{1j} S_n^j + \sigma^2}\right)$$

$$R_k = \sum_{n=1}^{N} \log\left(1 + \frac{G_n^{kk} S_n^k}{\sum_{j \neq k} G_n^{kj} S_n^j + \sigma^2}\right) \quad k \neq 1$$

$$\sum_{n=1}^{N} S_n^k \leq P^k, \forall k$$

$$0 \leq S_n^k \quad \forall k, n$$

where $E_{n,i}^k$ is transmit power of the $k^{th}$ user in the $i^{th}$ transmission pattern in the $n^{th}$ sub frequency band;

$G_n^{kk}$ is a transmission coefficient of the $k^{th}$ user in the $n^{th}$ sub frequency band;

$R_{target,k}$ is a target rate of the $k^{th}$ user;

$G_n^{kj}$ ($j \neq k$) is a crosstalk coefficient of the $j^{th}$ user to the $k^{th}$ user in the $n^{th}$ sub frequency band;

$p_{on}^k$ is transmit PSD of the $k^{th}$ user;

$p^k$ is a limitation on the total power of the $k^{th}$ user;

$\sigma^2$ is power of noise.

Spectrum optimization problem III is that the minimum rate is maximized (MaxMin) subject to that the total transmit power for each user does not exceed a limitation. The mathematic descriptions of this problem are as follows.

Equation group 3

$$\text{maximize } r_0$$

subject to $R_k \geq r_0$, $$R_k = \sum_{n=1}^{N} \log\left(1 + \frac{G_n^{kk} S_n^k}{\sum_{j \neq k} G_n^{kj} S_n^j + \sigma^2}\right)$$

$$\sum_{n=1}^{N} S_n^k \leq P^k, \forall k$$

$$0 \leq S_n^k \quad \forall k, n$$

where $S_n^k$ is the power allocated for the $k^{th}$ user in the $n^{th}$ sub frequency band;

$G_n^{kk}$ is a transmission coefficient of the $k^{th}$ user in the $n^{th}$ sub frequency band;

$G_n^{kj}$ ($j \neq k$) is a crosstalk coefficient of the $j^{th}$ user to the $k^{th}$ user in the $n^{th}$ sub frequency band;

$p^k$ is a limitation on the total power of the $k^{th}$ user;

$\omega_k$ is a weight coefficient of rate of the $k^{th}$ user;

$\sigma^2$ is power of noise;

$R_{target,k}$ is the target rate of the $k^{th}$ user;

$r_0$ is a minimum of the rates of all the users, that is, $r_0 = \min(R_k)$

The above target function with the constrained conditions is all non-convex function. There is no high efficient and complete solution. Among the existing algorithms, the most popular ones are Optimal Spectrum Balancing (OSB) algorithm and Iterative Spectrum Balancing (ISB) algorithm.

In the two algorithms, OSB algorithm is an optimization method and reduces the calculation complexity to $O(Ne^K)$ under the premise that the optimized solution is searched exhaustively. In the case that the number of users, K, is not too large, the result of the calculation may be acquired in an acceptable time. However, if the number of users increases, the calculation time increases in an exponential manner and increases to an unacceptable extent very soon.

The ISB algorithm is an improved algorithm on the basis of the OSB and reduces the calculation complexity to $O(NK^2)$.

The calculation complexity of the DSM algorithm is still in a high level although complexity reduction is given by the above two methods. When a transmit spectrum and transmit PSD are determined on the basis of the above two algorithms, too much time are used. The transmission efficiency is low.

SUMMARY OF THE INVENTION

Embodiments of the present invention provide a method and device for determining transmit PSD, so as to reduce the time for determining transmit PSD.

An embodiment of the present invention provides a method for determining transmit PSD. The method includes: calculating time sharing parameters corresponding to transmission patterns for all users in each frequency band; and determining transmit PSD according to the transmission patterns and the time sharing parameters.

An embodiment of the present invention provides a device for determining transmit PSD. The device includes: a calculation module, configured to calculate time sharing parameters corresponding to transmission patterns for all users in each frequency band; and a PSD determining module, configured to determine transmit PSD according to the transmission patterns and the time sharing parameters.

As can be seen from the above solution, in an embodiment of the present invention, the non-convex problem of solving an optimum frequency spectrum is converted into a Linear Programming problem by introducing the time sharing parameters, calculating time sharing parameters corresponding to the transmission patterns, and determining the transmit PSD according to the transmission patterns and the time sharing parameters, and because there is the universal mathematic solution to a Linear Programming problem and the calculation complexity is low, the calculation complexity for determining PSD is reduced greatly. Therefore, the time for determining the transmit PSD is saved.

DETAILED DESCRIPTION OF THE INVENTION

The present invention is hereinafter described in detail with reference to the drawings to further clarify the technical solutions and advantages of the present invention.

As can be seen from calculation results of the OSB, the optimization result in a frequency band where the crosstalk, is large is to perform frequency division multiplex on the basis of the users in the frequency band, and subject to that the optimum frequency bands for frequency division are determined, how to allocate power does not has large influence on the overall performance of the system. Therefore, embodiments of the present invention determine an optimum transmit spectrum and thus determine optimum transmit PSD.

It should be noted that, the term "optimum" in the embodiments of the present invention means "near-optimum".

It is difficult to implement the existing spectrum optimization and PSD optimization methods because all the methods are non-convex problems and thus the calculation complexity is high, hi an embodiment of the present invention, in order to solve this problem, a non-convex problem is converted into a Linear Programming problem by introducing time sharing parameters, calculating the time sharing parameters corresponding to the transmission patterns, and determining the optimum transmit spectrum according to the transmission pattern and the time sharing parameters. Thus, the calculation complexity is reduced. Moreover, a method for converting time sharing solution into frequency sharing solution is further proposed to simplify the implementation.

Figure 1:
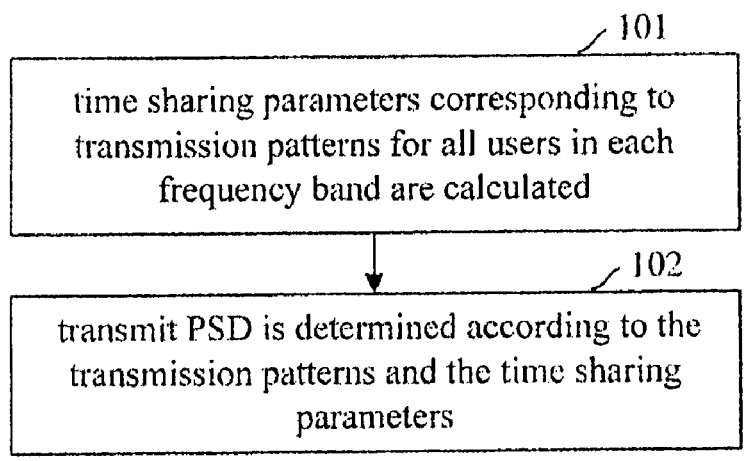
FIG. 1 illustrating a simplified flow chart according to an embodiment of the present invention.

With reference to FIG. 1, the flow chart of the method for determining transmit PSD according to an embodiment of the present invention is as follows.

Block 101: Time sharing parameters corresponding to transmission patterns for all users in each frequency band are calculated.

Block 102: Transmit PSD is determined according to the transmission patterns and the time sharing parameters.

An embodiment of the present invention also provides a device for determining transmit PSD. The device includes a calculation module and a PSD determining module. The calculation module is used for calculating time sharing parameters corresponding to transmission patterns for all users in each frequency band; the PSD determining module is used for determining the transmit PSD according to the transmission patterns and the time sharing parameters. The device may further include a setting module. The setting module is used for setting the transmission patterns, and may be further used for setting initial transmit PSD and a PSD adjusting value. The device may further include a time sharing solution to frequency sharing solution conversion module for converting an optimum transmit PSD in time sharing solution into an optimum transmit PSD in frequency sharing solution.

According to an embodiment of the present invention, after an optimum transmit spectrum is determined, transmit PSD is determined according to the optimum transmit spectrum. The optimum spectrum may be a spectrum maximizing the user rate. Specifically, more than one transmission pattern for all the users may be set in each frequency band; subject to that the user rate is maximized and the total power of each user is guaranteed not to exceed a limitation, the time sharing parameters corresponding to each transmission pattern in each frequency band are calculated according to the transmit PSD, and then the optimum transmit spectrum is determined according to the transmission patterns and the time sharing parameters. The user rate may be a weighted sum of the rates of all the users, a minimum of the rates of all the users, or a rate of a new user. In the case that the user rate is the rate of a new user, the time sharing parameters corresponding to each transmission pattern in each frequency band also need to guarantee the rates of existing users.

In the case that the optimum spectrum is a spectrum maximizing the user rate, the process for solving the time sharing parameters may be as follows. First, initial transmit PSD and a PSD adjusting value are set. Specifically, the setting is performed by the setting module. Then, subject to that the user rate is maximized and the total power of each user does not exceed the limitation, the time sharing parameter corresponding to each transmission pattern in each frequency band is solved on the basis of the initial transmit PSD, and then the corresponding user rate is calculated according to the time sharing parameters solved; the initial transmit PSD is adjusted for $\tau_{max}$ times according to the PSD adjusting value, and after each adjustment, subject to that the user rate is maximized and the total power of each user does not exceed the limitation, the time sharing parameter corresponding to each transmission pattern in each frequency band is solved according to the adjusted transmit PSD, and then the corresponding user rate is calculated according to the solved time sharing parameters corresponding to each transmission pattern. Finally, the maximum of the calculated $\tau_{max}+1$ rates of users is selected, and the time sharing parameter corresponding to each transmission pattern achieving the weighted sum of rates is used as the time sharing parameter corresponding to each transmission pattern of the transmit spectrum achieving the maximum user rate. Specifically, the processes are performed by the calculation module.

In an embodiment of the present invention, optimum transmit PSD may be further determined after an optimum transmit spectrum is determined. For example, transmit PSD of each user is determined according to the optimum transmit spectrum and the PSD corresponding to the user rate selected finally, and the transmit power is allocated according to the transmit PSD. For another example, the transmit PSD of each user is determined by performing iterative water filling for the user according to the determined optimum transmit spectrum, and the transmit power is allocated according to the transmit PSD.

The frequency band may be a sub frequency band or a group of sub frequency bands. The sub frequency band is applied in the case that time sharing solution can be performed while the group of sub frequency is applied in the case that time sharing solution cannot be performed.

In some systems, time sharing solution cannot be performed and only frequency sharing solution can be performed in a sub frequency band. In an embodiment of the present invention, time sharing solution is converted into frequency sharing solution. In other words, an optimum transmit spectrum in time sharing solution is converted into optimum transmit spectrum in frequency sharing solution according to the transmission patterns and time sharing parameters. For example, the sub frequency bands in the whole frequency band are divided into more than one group of sub frequency band and more than one transmission pattern is respectively set for each group of sub frequency band first. Time sharing parameters corresponding to each transmission pattern are calculated, and the sub frequency band used by each user in each group of sub frequency band is calculated according to the transmission patterns and the time sharing parameters calculated. Therefore, the transmit spectrum for all the users in the whole frequency band is acquired.

In an embodiment of the present invention, spectrum optimization problem I in the background is solved in a technology where time sharing solution cannot be performed in a sub frequency band. An example of the technology where time sharing solution cannot be performed is xDSL technology.

Figure 2:
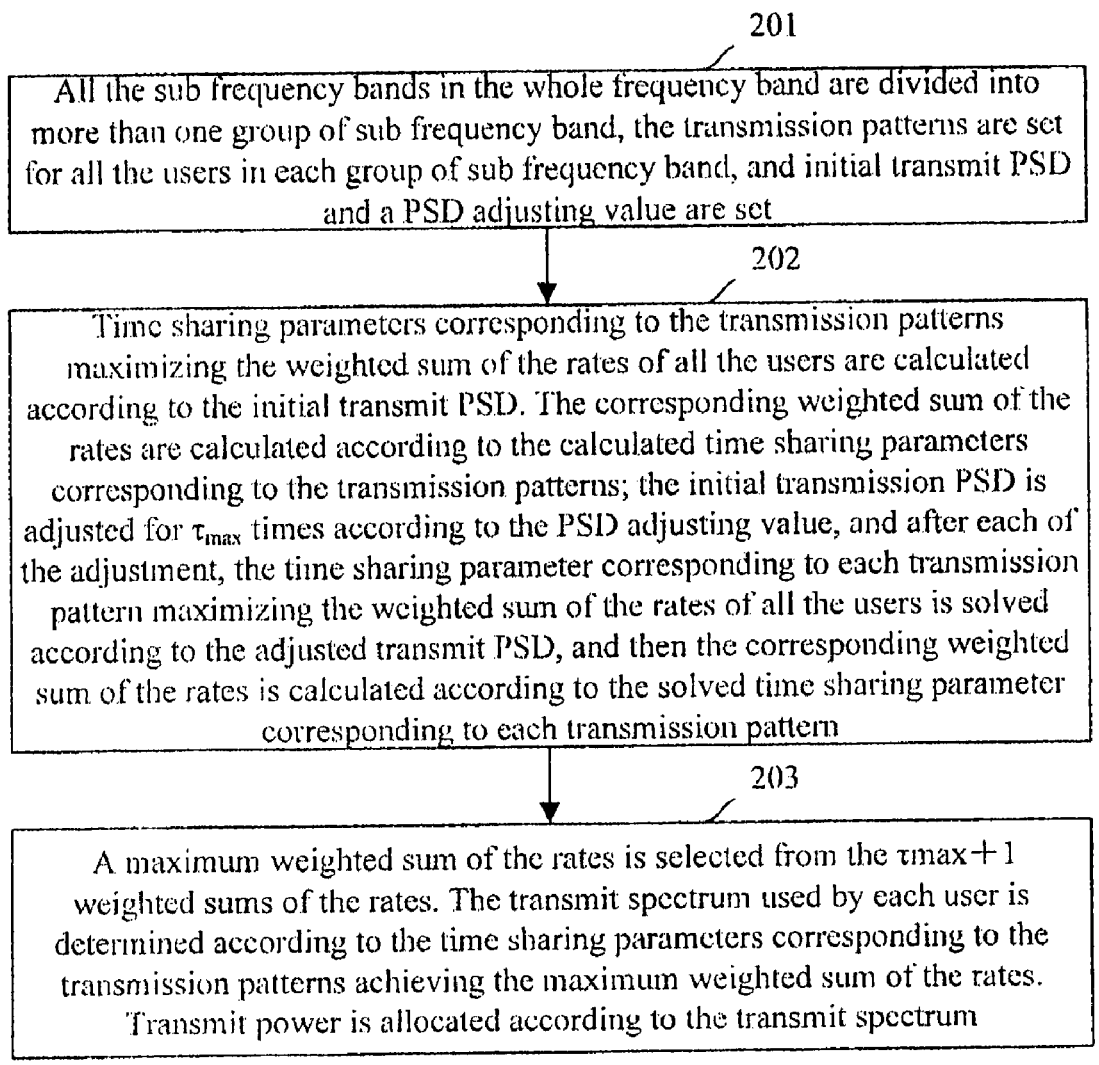
FIG. 2 is a How chart according to an embodiment of the present invention.

With reference to FIG. 2, the processes for determining an optimum transmit spectrum and the optimum transmit PSD and allocating the power according to the determined optimum transmit PSD are as follows.

Block 201: All the sub frequency bands in the whole frequency band are divided into more than one group of sub frequency band, the transmission patterns are set for all the users in each group of sub frequency band, and initial transmit PSD and a PSD adjusting value are set.

Because the direct channel characteristics and the crosstalk channel characteristics of adjacent sub frequency bands are similar, in this block, the sub frequency bands in the whole frequency band are divided into a few groups of sub frequency bands. The number of the groups may be determined according to the requirements on the optimization effect and the calculation complexity. For example, a larger number of groups are acquired when the requirement on the optimization effect is high and the requirement on the calculation complexity is low. For another example, a less number of groups are acquired when the requirement on the optimization effect is low and the requirement on the calculation complexity is high.

Block 202: Time sharing parameters corresponding to the transmission patterns maximizing the weighted sum of the rates of all the users are calculated according to the initial transmit PSD. The corresponding weighted sum of the rates are calculated according to the calculated time sharing parameters corresponding to the transmission patterns; the initial transmission PSD is adjusted for $\tau_{max}$ times according to the PSD adjusting value, and after each of the adjustment, the time sharing parameter corresponding to each transmission pattern maximizing the weighted sum of the rates of all the users is solved according to the adjusted transmit PSD, and then the corresponding weighted sum of the rates is calculated according to the solved time sharing parameter corresponding to each transmission pattern.

The value of $\tau_{max}$ can be determined according to the requirements on the optimization effect and the calculation complexity. For example, the value of $\tau_{max}$ can be larger when the requirement on the optimization effect is high and the requirement on the calculation complexity is low. For another example, the value of $\tau_{max}$ can be smaller when the requirement on the optimization effect is low and the requirement on the calculation complexity is high.

Block 203: A maximum weighted sum of the rates is selected from the $\tau_{max}+1$ weighted sums of the rates. The transmit spectrum used by each user is determined according to the time sharing parameters corresponding to the transmission patterns achieving the maximum weighted sum of the rates. Transmit power is allocated according to the transmit spectrum.

For example, the transmit PSD of each user is determined according to the transmit spectrum and the power allocation corresponding to the selected weighted sum of the rates, and transmit power is allocated according to the transmit PSD. For another example, the transmit PSD of each user is determined by performing iterative water filling for the user according to the transmit spectrum, and the transmit power is allocated according to the transmit PSD.

In Block 202, the time for each transmission pattern maximizing the weighted sum of the rates of all the users is solved according to the following equations.

Maximize $\qquad$ Equation group 4

$$\sum_{k=1}^{K} \omega_k \sum_{b=1}^{B} \sum_{i=1}^{M} \log_2\left(1 + \frac{G_b^{kk} E_{b,i}^k}{\sum_{j\neq k} G_b^{kj} E_{b,i}^j + \sigma^2}\right) f_{b,i}$$

Subject to $E_{b,i}^k = \begin{cases} P_{on}^k & \text{if } \phi_{b,i}(k)=1 \\ 0 & \text{otherwise} \end{cases}$ $$\sum_{b=1}^{N}\sum_{i=1}^{M} E_{b,i}^k f_{b,i} \le \frac{P^k}{BS}, \forall k$$

$$\sum_{i=1}^{M} f_{b,i} = 1 \quad \forall b$$

$$0 \le f_{b,i} \le 1 \quad \forall b, i$$

where, $E_{b,i}^k$ is transmit power of the $k^{th}$ user in the $i^{th}$ transmission pattern in the $b^{th}$ group of sub frequency band;

$G_b^{kk}$ is a transmission coefficient of the $k^{th}$ user in the $b^{th}$ group of sub frequency band;

$G_b^{kj}$ ($j \ne k$) is the crosstalk coefficient of the $j^{th}$ user to the $k^{th}$ user in the $b^{th}$ group of sub frequency band;

$f_{b,i}$ are the time sharing parameters of the group of sub frequency band;

$\phi_{b,i}$ are the transmission patterns of the group of sub frequency band;

$p_{on}^k$ is transmit PSD of the $k^{th}$ user;

$p^k$ is a limitation on the total power of the $k^{th}$ user and is set in advance;

$\omega_k$ is a weight factor of rate of the $k^{th}$ user and is set in advance;

$\sigma^2$ is power of noise;

BS is the number of sub frequency bands contained in each group of sub frequency band;

B is the number of the groups of sub frequency band.

In the above parameters, for example, the values of the three parameters, $G_b^{kk}$, $G_b^{kj}$ ($j \ne k$) and $\sigma^2$, are the values of the parameters corresponding to any sub frequency band in the group of sub frequency band. For another example, the values of the three parameters, $G_b^{kk}$, $G_b^{kj}$ ($j \ne k$) and $\sigma^2$ are the average values of the parameters corresponding to all the sub frequency bands in the group of sub frequency band.

Equation group 4 can be deduced from equation group 1. The deducing processes are as follows.

If there are K users in a bundle of lines and each user has N sub frequency bands, a parameter of transmission pattern, $\phi_{n,i}$, $i=1 \ldots M$, is defined for each sub frequency band. The parameter of transmission pattern is a vector. The length of the vector equals to the number of the users and each element of vector corresponds to a user. For example, if the element of the parameter of transmission pattern corresponding to a sub frequency band of a user equals to 1, it is indicated that the user can use the sub frequency band; if the element of the parameter of transmission pattern corresponding to a sub frequency band of a user equals to 0, it is indicated that the user is not allowed to use the sub frequency baud. For example, if K=3, the parameter of transmission pattern in the $n^{th}$ (n equals to 1, 2, . . . , N) sub frequency band of the N sub frequency bands may be written as: $\phi_{n,1}=[0\,0\,0]$, $\phi_{n,2}=[0\,0\,1]$, $\phi_{n,3}=[0\,1\,0]$, $\phi_{n,4}=[0\,1\,1]$, $\phi_{n,5}=[1\,0\,0]$, $\phi_{n,6}=[1\,0\,1]$, $\phi_{n,7}=[1\,1\,0]$, $\phi_{n,8}=[1\,1\,1]$.

The time sharing parameter, $f_{n,i}$, is a coefficient corresponding to each transmission pattern. $f_{n,i}$ determines the time occupied by the transmission pattern in a time slice. For example, if the time sharing parameters corresponding to 8 transmission patterns in the above example are $f_{n,1} = 0$, $f_{n,2} = \frac{1}{3}$, $f_{n,3} = \frac{1}{3}$, $f_{n,4} = 0$, $f_{n,5} = \frac{1}{3}$, $f_{n,6} = 0$, $f_{n,7} = 0$, $f_{n,8} = 0$, it is indicated that the $2^{nd}$, $3^{rd}$ and $5^{th}$ transmission patterns respectively occupy ⅓ of the time. In practices, three users respectively occupy three equal time slices to use the frequency resource of the $n^{th}$ sub frequency band separately. For another example, if $f_{n,i}=0$,($i=1,2 \ldots 7$), $f_{n,8}=1$, it is indicated that the three users can use the frequency resource of the $n^{th}$ sub frequency band at the same time. For another example, if $f_{n,1}=1$, $f_{n,i}=0$,($i=2,3 \ldots 8$), it is indicated that none of the three users can use the frequency resource of the $n^{th}$ sub frequency band.

As can be seen from the above examples, the time sharing parameter has the features as follows.

For any n, the sum of $f_{n,i}$ over i equals to $$1: \sum_{i=1}^{M} f_{n,i} = 1$$

$\forall n$;

For any n and i, the time sharing parameter is equal to or larger than 0, and is smaller than 1 or equal to 1: $0 \le f_{n,i} \le 1$ $\forall n,i$.

Spectrum optimization problem I in the background described by equation group 1 is a non-convex problem and there is no high effective mathematic solution. According to an embodiment of the present invention, the non-convex problem is converted into a Linear Programming problem by introducing transmission patterns and the time sharing parameters corresponding to the transmission patterns, and the calculation complexity is lowered.

In an embodiment of the present invention, spectrum optimization problem I is converted into the problem that; subject to that the total power of each user does not exceed a limitation, the weighted sum of the rates of all the users is maximized by adjusting the time sharing parameters of transmission pattern of each user in each sub frequency band. In this problem, the transmit PSD of each user is a constant. The mathematic description of this problem is described by equation group 5 as follows.

Maximize      Equation group 5

$$\sum_{k=1}^{K} \omega_k \sum_{n=1}^{N} \sum_{i=1}^{M} \log_2\left(1 + \frac{G_n^{kk} E_{n,i}^k}{\sum_{j \neq k} G_n^{kj} E_{n,i}^j + \sigma^2}\right) f_{n,i}$$

Subject to $E_{n,i}^k = \begin{cases} P_{on}^k & \text{if } \phi_{n,i}(k) = 1 \\ 0 & \text{otherwise} \end{cases}$ $$\sum_{n=1}^{N} \sum_{i=1}^{M} E_{n,i}^k f_{n,i} \leq P^k, \quad \forall k$$

$$\sum_{i=1}^{M} f_{n,i} = 1 \quad \forall n$$

$$0 \leq f_{n,i} \leq 1 \quad \forall n, i$$

where $E_{n,i}^k$ is transmit power of the $k^{th}$ user in the $i^{th}$ transmission pattern in the $n^{th}$ sub frequency band;

$G_n^{kk}$ is a transmission coefficient of the $k^{th}$ user in the $n^{th}$ sub frequency band;

$G_n^{kj}$ ($j \neq k$) is a crosstalk coefficient of the $j^{th}$ user to the $k^{th}$ user in the $n^{th}$ sub Frequency band;

$p_{on}^k$ is transmit PSD of the $k^{th}$ user;

$p^k$ is a limitation on the total power of the $k^{th}$ user; $\omega_k$ is the weight coefficient of rate of the $k^{th}$ user;

$\sigma^2$ is power of noise.

Similarly, in an embodiment of the present invention, spectrum optimization problem II is converted into the problem that: subject to that the total transmit power of each user does not exceed a limitation, the rate of a new user is maximized while the target rates of existing users are guaranteed, by adjusting the time sharing parameters of the transmission pattern for each user in each sub frequency band. In this problem, the transmit PSD of each user is a constant. The mathematic descriptions of this problem are as follows.

Maximize      Equation group 6

$$\sum_{n=1}^{N} \sum_{i=1}^{M} \log\left(1 + \frac{G_n^{11} E_{n,i}^1}{\sum_{j \neq 1} G_n^{1j} E_{n,i}^j + \sigma^2}\right) f_{n,i}$$

Subject to $$\sum_{n=1}^{N} \sum_{i=1}^{M} \log\left(1 + \frac{G_n^{kk} E_{n,i}^k}{\sum_{j \neq k} G_n^{kj} E_{n,i}^j + \sigma^2}\right) f_{n,i} \geq R_{target,k} \quad k \neq 1$$

$E_{n,i}^k = \begin{cases} P_{on}^k & \text{if } \phi_{n,i}(k) = 1 \\ 0 & \text{otherwise} \end{cases}$ $$\sum_{n=1}^{N} \sum_{i=1}^{M} E_{n,i}^k f_{n,i} \leq P^k, \quad \forall k$$

$$\sum_{i=1}^{M} f_{n,i} = 1 \quad \forall n$$

$$0 \leq f_{n,i} \leq 1 \quad \forall n, i$$

where $E_{n,i}^k$ is transmit power of the $k^{th}$ user in the $i^{th}$ transmission pattern in the $n^{th}$ sub frequency band;

$E_{n,i}^1$ is transmit power of the new user in the $i^{th}$ transmission pattern in the $b^{th}$ group of sub frequency band; Similarly, the subsequent parameters in which k equals to 1 are the parameters corresponding to the new user;

$G_n^{kk}$ is a transmission coefficient of the $k^{th}$ user in the $n^{th}$ sub frequency band;

$R_{target,k}$ is a target rate of the $k^{th}$ user;

$G_n^{kj}$ ($j \neq k$) is a crosstalk coefficient of the $j^{th}$ user to the $k^{th}$ user in the $n^{th}$ sub frequency band;

$p_{on}^k$ is transmit PSD of the $k^{th}$ user;

$p^k$ is a limitation on the total power of the $k^{th}$ user;

$\sigma^2$ is power of noise.

In an embodiment of the present invention, spectrum optimization problem III is converted into the problem that: subject to that the total transmit power of each user does not exceed the limitation, the minimum rate is maximized by adjusting the time sharing parameters of the transmission pattern for each user in each sub frequency band. In this problem, the transmit PSD of each user is a constant. The mathematic descriptions of this problem are as follows.

Maximize $r_0$      Equation group 7

Subject to $$\sum_{n=1}^{N} \sum_{i=1}^{M} \log\left(1 + \frac{G_n^{kk} E_{n,i}^k}{\sum_{j \neq k} G_n^{kj} E_{n,i}^j + \sigma^2}\right) f_{n,i} \geq r_0$$

$E_{n,i}^k = \begin{cases} P_{on}^k & \text{if } \phi_{n,i}(k) = 1 \\ 0 & \text{otherwise} \end{cases}$ $$\sum_{n=1}^{N} \sum_{i=1}^{M} E_{n,i}^k f_{n,i} \leq P^k, \forall k$$

$$\sum_{i=1}^{M} f_{n,i} = 1 \quad \forall n$$

$$0 \leq f_{n,i} \leq 1 \quad \forall n, i$$

where $r_0$ is a minimum rate;

$E_{n,i}^k$ is transmit power of the $k^{th}$ user in the $i^{th}$ transmission pattern in the $n^{th}$ sub frequency band;

$G_n^{kk}$ is a transmission coefficient of the $k^{th}$ user in the $n^{th}$ sub frequency band;

$G_n^{kj}$ ($j \neq k$) is a crosstalk coefficient of the $j^{th}$ user of the $k^{th}$ user in the $n^{th}$ sub frequency band;

$p_{on}^k$ is transmit PSD of the $k^{th}$ user;

$p^k$ is a limitation on the total power of the $k^{th}$ user;

$\sigma^2$ is power of noise.

The non-convex problem is converted into a Linear Programming problem with the above conversion. The Linear Programming problem has general mathematic solution. The calculation complexity is O(KM) which is quite low. The time sharing parameter, $f_{n,i}$, corresponding to the transmission pattern, $\phi_{nj}$, is easy to be solved with equation groups 5, 6 and 7.

In practice, some technology, such as xDSL, does not support time sharing solution in a sub frequency band. Thus, the time sharing solution needs to be converted into a frequency sharing solution.

In practice, the direct channel characteristics and the crosstalk channel characteristics of adjacent sub frequency bands are similar. Therefore the sub frequency bands in the whole frequency band may be divided into a few of groups. For example, BS sub frequency bands are divided into a group of sub frequency bands. The direct channel characteristic and the crosstalk channel characteristic of a sub frequency band in each group of sub frequency band is used to represent the direct channel characteristic and the crosstalk channel characteristic of the group, or the average direct channel characteristic and the average crosstalk channel characteristic of all the sub frequency bands in each group of sub frequency band are used to represent the direct channel characteristic and the crosstalk channel characteristic of the group.

Accordingly, according to equation group 5, the parameters on the basis of the sub frequency bands may be converted into parameters on the basis of the groups of sub frequency band.

$E_{n,i}^k \rightarrow E_{b,i}^k$, and $E_{b,i}^k$ is transmit power of the $k^{th}$ user in the $i^{th}$ transmission pattern in the $b^{th}$ group of sub frequency band;

$G_n^{kk} \rightarrow G_b^{kk}$, and $G_b^{kk}$ is a transmission coefficient of the $k^{th}$ user in the $b^{th}$ group of sub frequency band;

$G_n^{kj} \rightarrow G_b^{kj}$ ($j \neq k$), and $G_b^{kj}$ ($j \neq k$) is a crosstalk coefficient of the $j^{th}$ user to the $k^{th}$ user in the $b^{th}$ group of sub frequency band;

$f_{n,i} \rightarrow f_{b,i}$, and $f_{b,i}$ spring parameter corresponding to the $i^{th}$ transmission pattern in the $b^{th}$ group of sub frequency band;

$\phi_{n,i} \rightarrow \phi_{b,i}$, and $\phi_{b,i}$ is the $i^{th}$ transmission pattern in the $b^{th}$ group of sub frequency band;

$N \rightarrow B$, and B is the number of the groups of sub frequency band.

$p_{on}^k$ is transmit PSD of the $k^{th}$ user;

$p^k$ is a limitation on the total power of the $k^{th}$ user;

$\omega_k$ is a weight coefficient of rate of the $k^{th}$ user;

$\sigma^2$ is power of noise;

BS is the number of sub frequency bands contained in each group of sub frequency band.

Thus, equation group 5 is converted into equation group 4. Similarly, equation group 6 may be converted into equation group 8 as follows.

$$\text{Maximize} \sum_{b=1}^{B} \sum_{i=1}^{M} \log\left(1 + \frac{G_b^{11} E_{b,i}^1}{\sum_{j \neq 1} G_b^{1j} E_{b,i}^j + \sigma^2}\right) f_{b,i} \quad \text{Equation group 8}$$

Subject to $$\sum_{b=1}^{B} \sum_{i=1}^{M} \log\left(1 + \frac{G_b^{kk} E_{b,i}^k}{\sum_{j \neq k} G_b^{kj} E_{b,i}^j + \sigma^2}\right) f_{b,i} \geq$$

$$R_{target,k} \quad k \neq 1$$

$$E_{b,i}^k = \begin{cases} P_{on}^k & \text{if } \phi_{b,i}(k) = 1 \\ 0 & \text{otherwise} \end{cases}$$

$$\sum_{b=1}^{B} \sum_{i=1}^{M} E_{b,i}^k f_{b,i} \leq \frac{P^k}{BS}, \forall k$$

$$\sum_{i=1}^{M} f_{b,i} = 1 \quad \forall b$$

$$0 \leq f_{b,i} \leq 1 \quad \forall b, i$$

where, $E_{b,i}^1$ is the transmit power of a new user in the $i^{th}$ transmission pattern in the $b^{th}$ group of sub frequency band; similarly, the other parameters in which k equals to 1 are the parameters corresponding to the new user.

Equation group 7 may be converted into equation group 9 as follows.

Maximize $r_0$ \hfill Equation group 9

Subject to $$\sum_{b=1}^{B} \sum_{i=1}^{M} \log\left(1 + \frac{G_b^{kk} E_{b,i}^k}{\sum_{j \neq k} G_b^{kj} E_{b,i}^j + \sigma^2}\right) f_{b,i} \geq r_0$$

$$E_{b,i}^k = \begin{cases} P_{on}^k & \text{if } \phi_{b,i}(k) = 1 \\ 0 & \text{otherwise} \end{cases}$$

$$\sum_{b=1}^{B} \sum_{i=1}^{M} E_{b,i}^k f_{b,i} \leq \frac{P^k}{BS}, \forall k$$

$$\sum_{i=1}^{M} f_{b,i} = 1 \quad \forall b$$

$$0 \leq f_{b,i} \leq 1 \quad \forall b, i$$

Thus, the time sharing parameters corresponding to each transmission pattern in each sub frequency band may be calculated with equation groups 4, 8 and 9. The final transmit PSD in frequency sharing solution can be calculated with the time sharing parameters of each group of sub frequency band.

Figures 3, 4:
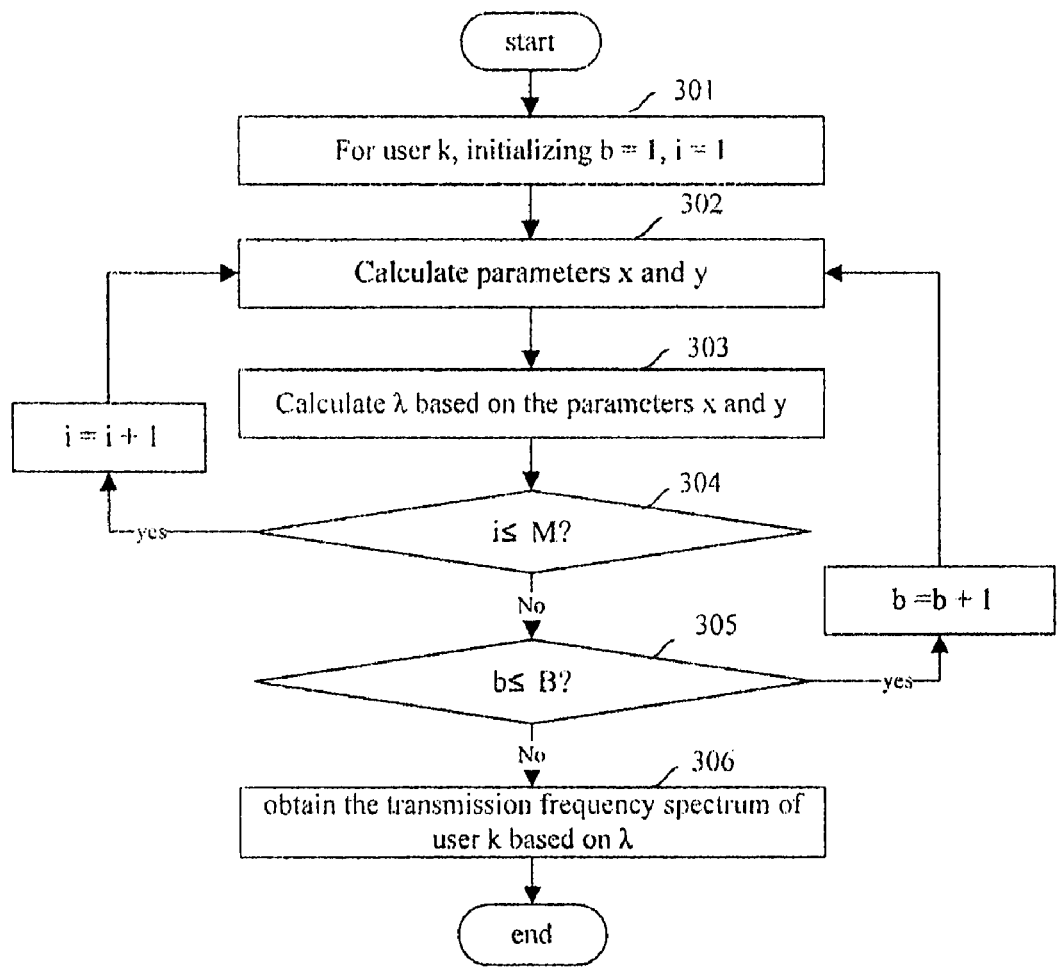
FIG. 3 is a flow chart of the T2F method according to an embodiment of the present invention.
FIG. 4 is a diagram illustrating the structure of an exemplary spectrum according to an embodiment of the present invention.

The method for calculating the final transmit PSD of frequency sharing solution with the time sharing parameters of each group of sub frequency band may be called as T2F method. In the T2F method, the procedure shown in FIG. 3 is performed for each user.

Block 301: For user k, initializing b=1, i=1.
Block 302: Calculate parameters x and y:

$$x = (b-1)BS + \sum_{j=1}^{i-1} \lfloor BS \cdot f_{b,j} \rfloor + 1$$

$$y = (b-1)BS + \sum_{j=1}^{i-1} \lfloor BS \cdot f_{b,j} \rfloor + \lfloor BS \cdot f_{b,i} \rfloor$$

Block 303: Calculate $\lambda_k(j)$ according to the parameters of the transmission pattern and parameters x and y:

$$\lambda_k(j) = \phi_{b,i}(k), j = x, x+1, \ldots, y-1, y$$

where $\phi_{b,i}(k)$ is the value of the element corresponding to the $k^{th}$ user in the $i^{th}$ transmission pattern in the $b^{th}$ group of sub frequency band; $\lambda_k(j)$ indicates whether the $k^{th}$ user uses the $j^{th}$ sub frequency band.

Diamond 304: Determine whether i≤M, where M is the number of the transmission patterns in each group of sub frequency band; if i≤M, i=i+1 and return to Block 302, otherwise, go to Block 305.

Diamond 305: Determine whether b≤B, where B is the number of the groups of sub frequency band; if b≤B, b=b+1, i=1, and return to Block 302, otherwise, go to Block 306.

Block 306: Express the transmit spectrum of user k by $\lambda_k(j)$: $\Psi_k = \lambda_k(j), j=1, \ldots, N$, where N is the number of sub frequency bands.

The algorithm of the procedure shown in FIG. 3 can be described as follows.

Loop 1: for all the groups of sub frequency bands, b=1, ..., B
Loop 2: for all the transmission patterns, i=1, ..., M $$\text{setting } x = (b-1)BS + \sum_{j=1}^{i-1} \lfloor BS \cdot f_{b,j} \rfloor + 1$$

$$\text{setting } y = (b-1)BS + \sum_{j=1}^{i-1} \lfloor BS \cdot f_{b,j} \rfloor + \lfloor BS \cdot f_{b,i} \rfloor$$

$$\lambda_k(j) = \phi_{b,i}(k), j = x, x+1, \ldots, y-1, y$$

End of loop 2.
End of loop 1.

Finally, the transmit PSD of user k, $\Psi_k = \lambda_k(j), J=1, \ldots, N$, is acquired. $\lambda_k(j)$ indicates whether the $k^{th}$ user uses the $j^{th}$ sub frequency band. $\lambda_k(j)=1$ indicates that the $k^{th}$ user uses the $j^{th}$ sub frequency band, otherwise, it is indicated that the $k^{th}$ user does not use the $j^{th}$ sub frequency band.

Using the T2F method, if there are 3 users (K=3), 18 sub frequency bands (N=18), and 9 sub frequency bands are divided into a group of sub frequency bands (BS=9), the 18 sub frequency bands are divided into two groups of sub frequency band (B=2). If each group of sub frequency band corresponds to 5 transmission patterns, $\phi_{b,1}=(1\ 1\ 1), \phi_{b,2}=(0\ 0\ 1), \phi_{b,3}=(0\ 1\ 0), \phi_{b,4}=(1\ 0\ 0), \phi_{b,5}=(0\ 0\ 0)$, the time sharing parameters corresponding to the two groups of sub frequency band can be calculated with equation group 4: $f_{1,1}=1, f_{1,2}=0, f_{1,3}=0, f_{1,4}=0, f_{1,5}=0; f_{2,1}=0$, $$f_{2,2} = \frac{1}{3},$$

-continued $$f_{2,3} = \frac{1}{3},$$

$$f_{2,4} = \frac{1}{3},$$

$$f_{2,5} = 0.$$

With reference to FIG. 4, the transmit PSD of each user may be determined with the time sharing parameters. As may be seen in FIG. 4, in group 1 of sub frequency band, all the users perform transmission at the same time, because the time sharing parameter corresponding to the transmission pattern $\phi_{b,1}=(1\ 1\ 1)$ is 1, which indicates that all the users occupy the group of sub frequency band at the same time. In group 2 of sub frequency band, the three users respectively occupy one third of the sub frequency bands and time sharing is achieved, because the time sharing parameters, $$f_{2,2} = \frac{1}{3},$$

$$f_{2,3} = \frac{1}{3} \text{ and}$$

$$f_{2,4} = \frac{1}{3},$$

corresponding to the transmission patterns. $\phi_{2,2}=(0\ 0\ 1), \phi_{2,3}=(0\ 1\ 0), \phi_{2,4}=(1\ 0\ 0)$. In practice, time sharing cannot be performed in the xDSL. The time sharing parameters can be converted into ratios for using a group of sub frequency bands, and thus, the time sharing solution is converted into a frequency sharing solution.

For example, to solve spectrum optimization problem I, there are two implementation methods for acquiring optimum transmit PSD. One is called Linear Programming—constant power (LP-CP) method, and the other is called Linear Programming—iterative water filling (LP-IWF) method.

The LP-CP method is as follows.

Process 1: Determine the time sharing parameters of a group of sub frequency bands.

A) Determine the number of sub frequency bands contained in the group of sub frequency band (BS); determine the transmission pattern of the group of sub frequency band ($\phi_{b,i}$); determine initial transmit PSD ($P_{init}$) and a PSD adjusting value ($\Delta P_{on}$). The unit of PSD is dBm;

B) The optimum time sharing parameters corresponding to different transmit PSD are respectively calculated with the following loop:

Loop: for each transmit PSD, $\tau=0,1,2,\ldots,\tau_{max}$

1) Set the transmit PSD, $P_{on}^1 = P_{on}^2 = \ldots = P_{on}^K = P_{init} + \tau \cdot \Delta P_{on}$;

2) Solve the optimum time sharing parameters, $f_{b,i}^*$, of the transmission patterns in the group of sub frequency band according to equation group 4, i.e., $\{f_{b,i}^*(\tau)\} \Leftarrow LP(P_{on}, G_n, \phi_{n,i}, \omega_k)$;

3) Calculate the weighted sum of the rates of all the users, $A(\tau)$, by:

$$\Lambda(\tau) = \sum_{k=1}^{K} \omega_k \sum_{b=1}^{B} \sum_{i=1}^{M} \log\left(1 + \frac{G_b^{kk} E_{b,i}^k}{\sum_{j \neq k} G_b^{kj} E_{b,i}^j + \sigma^2}\right) f_{b,i}^*$$

End the loop.

C) Compare the weighted sums of the rates calculated in various transmit PSD with each other, select the time sharing parameters corresponding to the maximum weighted sum of the rates as the optimum time sharing parameters, $$f_{b,i}^* = \arg\max_{f_{b,i}} \Lambda(\tau),$$

and determine the transmit PSD ($P_{on}$) corresponding to the optimum time sharing parameters.

Process 2: Convert the time sharing parameters calculated in the above process into the transmit spectrum used by the user, ($\Psi_k$), using the T2F method.

Process 3: Use the transmit PSD ($P_{on}$) and the transmit spectrum $\Psi_k$ determined in the above process as the final optimization result and allocate the transmit power according to the optimization result.

The LP-IWF method is as follows.

Process 1: Determine the time sharing parameters of a group of sub frequency bauds.

A) Determine the number of sub frequency bands contained in the group of sub frequency band (BS); determine the transmission pattern of the group of sub frequency band ($\phi_{b,i}$); determine initial transmit PSD ($P_{init}$) and a PSD adjusting granularity ($\Delta P_{on}$). The unit of PSD is dBm;

B) The optimum time sharing parameters on the basis of different transmit PSD are respectively calculated with the following loop:

Loop: for each transmit PSD, $\tau=0,1,2,\ldots,\tau_{max}$
1) Set the transmit PSD, $P_{on}^1 = P_{on}^2 = \ldots = P_{on}^K = P_{init} + \tau \cdot \Delta P_{on}$;
2) Solve the optimum lime sharing parameters, $f_{b,i}^*$, of the transmission patterns in the group of sub frequency band according to equation group 4, i.e., $\{f_{b,i}^*(\tau)\} \Leftarrow LP(P_{on}, G_n, \phi_{n,i}, \omega_k)$;
3) Calculate the weighted sum of the rates:

$$\Lambda(\tau) = \sum_{k=1}^{K} \omega_k \sum_{b=1}^{B} \sum_{i=1}^{M} \log\left(1 + \frac{G_b^{kk} E_{b,i}^k}{\sum_{j \neq k} G_b^{kj} E_{b,i}^j + \sigma^2}\right) f_{b,i}^*$$

End the loop.

C) Compare the weighted sums of the rates calculated in the cases of various transmit PSD with each other, and select the time sharing parameters corresponding to the maximum weighted sum of the rates as the optimum time sharing parameters, $$f_{b,i}^* = \arg\max_{f_{b,i}} \Lambda(\tau).$$

Process 2: Convert the time sharing parameters calculated into the transmit spectrum used by the user, ($\Psi_k$), using the T2F method.

Process 3: Perform iterative water filling for each user using the transmit spectrum to allocate the transmit power for the user.

Both spectrum optimization problems II and III can be solved with a method similar to the above LP-CP or LP-IWF method, which will not be detailed here.

The above is the description of the detailed embodiments of the present invention. The method of the present invention can be modified appropriately during a specific implementation, to meet the specific requirements of the specific cases. It is thereby understood that the detailed embodiments according to the present invention are just demonstrative, and are not for use in limiting the protection scope of the present invention.

What is claimed is:

1. A method for determining a transmit power spectral density (PSD), comprising:
   calculating time sharing parameters corresponding to transmission patterns for all users in each frequency band; and
   determining the transmit PSD according to the transmission patterns and the time sharing parameters;
   wherein the calculating time sharing parameters corresponding to transmission patterns for all users in each frequency band comprises:
   calculating a time sharing parameter for each of the transmission patterns in each frequency band according to an initial transmit PSD subject to that a user rate is maximized and the total power of each user does not exceed a limitation.

2. The method of claim 1, wherein the calculating a time sharing parameter for each of the transmission patterns in each frequency band according to an initial transmit PSD subject to that a user rate is maximized and the total power of each user does not exceed a limitation comprises:
   setting the initial transmit PSD and a PSD adjusting value;
   calculating a time sharing parameter corresponding to each of the transmission patterns in each frequency band according to the initial transmit PSD subject to that the user rate is maximized and the total power of each user does not exceed the limitation;
   calculating an initial user rate according to the time sharing parameters calculated;
   adjusting the initial transmit PSD for τmax times according to the PSD adjusting value, in response to each adjustment, calculating a mid time sharing parameter corresponding to each transmission pattern in each frequency band according to the adjusted transmit PSD subject to that the user rate is maximized and the total power of each user does not exceed the limitation;
   calculating a mid user rate according to the mid time sharing parameter calculated corresponding to each of the transmission patterns; and
   selecting a maximum of the calculated τmax+1 rates of the users, and using time sharing parameters corresponding to the transmission patterns subject to the maximum as the time sharing parameters corresponding to the transmission patterns.

3. The method of claim 2, wherein the determining transmit PSD according to the transmission patterns and the time sharing parameters comprises:
   determining a transmit spectrum according to the transmission patterns and the time sharing parameters;

determining the transmit PSD of each user according to the transmit spectrum and PSD corresponding to the maximum of the calculated τmax+1 rates of the users; and allocating transmit power according to the transmit PSD.

4. The method of claim 2, wherein the determining transmit PSD according to the transmission patterns and the time sharing parameters comprises:

determining a transmit spectrum according to the transmission patterns and the time sharing parameters;

determining the transmit PSD of each user by performing iterative water filling for the user according to the transmit spectrum; and allocating transmit power according to the transmit PSD.

5. The method of claim 1, wherein the user rate is selected from a group consisting of: a weighted sum of the rates of all the users, a rate of a new user, and a minimum of the rates of all the users;

wherein if the user rate is the rate of a new user, target rates of existing users are guaranteed by the time sharing parameters for each of the transmission patterns in each frequency band.

6. The method of claim 5, wherein the frequency band is a sub frequency band, in the case that the user rate is the weighted sum of the rates of all the users, the time sharing parameter corresponding to each of the transmission patterns in each frequency band is given by:

$$\text{Maximize} \sum_{k=1}^{K} \omega_k \sum_{n=1}^{N} \sum_{i=1}^{M} \log_2\left(1 + \frac{G_n^{kk} E_{n,i}^k}{\sum_{j \neq k} G_n^{kj} E_{n,i}^j + \sigma^2}\right) f_{n,i}$$

$$\text{Subject to } E_{n,i}^k = \begin{cases} P_{on}^k & \text{if } \phi_{n,i}(k) = 1 \\ 0 & \text{otherwise} \end{cases}$$

$$\sum_{n=1}^{N} \sum_{i=1}^{M} E_{n,i}^k f_{n,i} \leq P^k, \ \forall k$$

$$\sum_{i=1}^{M} f_{n,i} = 1 \ \forall n$$

$$0 \leq f_{n,i} \leq 1 \ \forall n, i$$

in the case that the user rate is the rate of a new user, the time sharing parameter corresponding to each of the transmission patterns in each frequency band is given by:

$$\text{Maximize} \sum_{n=1}^{N} \sum_{i=1}^{M} \log\left(1 + \frac{G_n^{11} E_{n,i}^1}{\sum_{j \neq 1} G_n^{1j} E_{n,i}^j + \sigma^2}\right) f_{n,i}$$

$$\text{Subject to } \sum_{n=1}^{N} \sum_{i=1}^{M} \log\left(1 + \frac{G_n^{kk} E_{n,i}^k}{\sum_{j \neq k} G_n^{kj} E_{n,i}^j + \sigma^2}\right) f_{n,i} \geq R_{target,k} \ k \neq 1$$

$$E_{n,i}^k = \begin{cases} P_{on}^k & \text{if } \phi_{n,i}(k) = 1 \\ 0 & \text{otherwise} \end{cases}$$

$$\sum_{n=1}^{N} \sum_{i=1}^{M} E_{n,i}^k f_{n,i} \leq P^k, \ \forall k$$

$$\sum_{i=1}^{M} f_{n,i} = 1 \ \forall n$$

$$0 \leq f_{n,i} \leq 1 \ \forall n, i$$

in the case that the user rate is the minimum of the rates of all the users, the time sharing parameter corresponding to each of the transmission patterns in each frequency band is given by:

Maximize $r_0$ $$\text{Subject to } \sum_{n=1}^{N} \sum_{i=1}^{M} \log\left(1 + \frac{G_n^{kk} E_{n,i}^k}{\sum_{j \neq k} G_n^{kj} E_{n,i}^j + \sigma^2}\right) f_{n,i} \geq r_0$$

$$E_{n,i}^k = \begin{cases} P_{on}^k & \text{if } \phi_{n,i}(k) = 1 \\ 0 & \text{otherwise} \end{cases}$$

$$\sum_{n=1}^{N} \sum_{i=1}^{M} E_{n,i}^k f_{n,i} \leq P^k, \ \forall k$$

$$\sum_{i=1}^{M} f_{n,i} = 1 \ \forall n$$

$$0 \leq f_{n,i} \leq 1 \ \forall n, i$$

where $E_{n,i}^k$ is the transmit power of the kth user in the ith transmission pattern in the nth sub frequency band and is determined according to the transmit PSD;

$E_{n,i}^1$ is the transmit power of the new user in the ith transmission pattern in the nth group of sub frequency band; the subsequent parameters in which k equals to 1 are the parameters corresponding to the new user;

$f_{n,i}$ is a time sharing parameter corresponding to the ith transmission pattern in the nth sub frequency band;

$\phi_{n,i}$ is the ith transmission pattern in the nth sub frequency band, wherein M transmission patterns are set in each sub frequency band, each transmission pattern is a vector, the length of which equals to number of the users and each element of which corresponds to a user;

$\phi_{n,i}(k)$ is a value of the element corresponding to the kth user in the ith transmission pattern in the nth sub frequency band;

$G_n^{kk}$ is a transmission coefficient of the kth user in the nth sub frequency band;

$G_n^{kj}(j \neq k)$ is a crosstalk coefficient of the jth user to the kth user in the nth sub frequency band;

$P_{on}^k$ is transmit PSD of the kth user and is determined by the transmit PSD;

$P^k$ is a limitation on the total power of the kth user;

$\omega_k$ is a weight coefficient of rate of the kth user;

$\sigma^2$ is power of noise.

$R_{target,k}$ is a target rate of the kth user;

$r_0$ is a minimum of the rates of all the users, that is, $r_0 = \min(R_k)$.

7. The method of claim 1, further comprising:

converting the transmit PSD in time sharing solution into transmit PSD in frequency sharing solution according to the transmission patterns and time sharing parameters.

8. The method of claim 7, wherein the frequency band is a group of sub frequency bands, and the group of sub frequency bands is obtained by dividing sub frequency bands in the whole frequency band into more than one group of sub frequency band.

9. The method of claim 8, wherein the converting the transmit PSD in time sharing solution into transmit PSD in frequency sharing solution according to the transmission patterns and time sharing parameters comprises:
calculating a sub frequency band used by each user in each group of sub frequency band according to the transmission patterns and the time sharing parameters to acquire the transmit spectrum for all users in the whole frequency band.

10. The method of claim 9, wherein each of the transmission patterns in each group of sub frequency band is a vector, and the length of the vector equals to the number of the users and each element of the vector corresponds to a user;
transmit spectrum for user k is calculated by:
process 1: for user k, initializing b=1, i=1; where, b is the bth group of sub frequency band and i is the ith transmission pattern;
process 2: calculating parameters x and y, and x and y are given by $$x = (b-1)BS + \sum_{j=1}^{i-1} \lfloor BS \cdot f_{b,j} \rfloor + 1$$

$$y = (b-1)BS + \sum_{j=1}^{i-1} \lfloor BS \cdot f_{b,j} \rfloor + \lfloor BS \cdot f_{b,i} \rfloor$$

BS is number of sub frequency bands contained in a group of sub frequency bands,
$f_{b,i}$ is a time sharing parameter corresponding to the ith transmission pattern in the bth group of sub frequency band, and
$f_{b,j}$ is a time sharing parameter corresponding to the jth transmission pattern in the bth group of sub frequency band;
process 3: calculating $\lambda_k(j)$ according to the parameters of the transmission pattern and parameters x and y, and $\lambda_k(j)$ is given by $$\lambda_k(j) = \phi_{b,i}(k), j = x, x+1, \ldots, y-1, y$$

where $\phi_{b,i}(k)$ is the value of the element corresponding to the kth user in the ith transmission pattern in the bth group of sub frequency band;
$\lambda_k(j)$ indicates whether the kth user uses the jth sub frequency band;
process 4: if i≦M, where M is the number of the transmission patterns in each group of sub frequency band, i=i+1 and returning to process 2; otherwise, performing process 5;
process 5: if b≦B, where B is the number of the groups of sub frequency band, b=b+1, i=1, and returning to process 2, otherwise, performing process 6;
process 6: acquiring the transmit spectrum of user k, $\Psi_k = \lambda_k(j), j=1, \ldots, N$, where N is the number of sub frequency bands according to the $\lambda_k(j)$.

11. The method of claim 8, wherein
in the case that the user rate is the weighted sum of the rates of all the users, each of the time sharing parameters corresponding to each of the transmission patterns is given by:

$$\text{Maximize} \sum_{n=1}^{N} \sum_{i=1}^{M} \log\left(1 + \frac{G_n^{11} E_{n,i}^1}{\sum_{j \neq 1} G_n^{1,j} E_{n,i}^j + \sigma^2}\right) f_{n,i}$$

$$\text{Subject to} \sum_{n=1}^{N} \sum_{i=1}^{M} \log\left(1 + \frac{G_n^{kk} E_{n,i}^k}{\sum_{j \neq k} G_n^{kj} E_{n,i}^j + \sigma^2}\right) f_{n,i} \geq R_{target,k} \quad k \neq 1$$

$$E_{n,i}^k = \begin{cases} P_{on}^k & \text{if } \phi_{n,i}(k) = 1 \\ 0 & \text{otherwise} \end{cases}$$

$$\sum_{n=1}^{N} \sum_{i=1}^{M} E_{n,i}^k f_{n,i} \leq P^k, \forall k$$

$$\sum_{i=1}^{M} f_{n,i} = 1 \; \forall n$$

$$0 \leq f_{n,i} \leq 1 \; \forall n, i$$

in the case that the user rate is the rate of a new user, each of the time sharing parameters corresponding to each of the transmission patterns is given by:

$$\text{Maximize} \sum_{b=1}^{B} \sum_{i=1}^{M} \log\left(1 + \frac{G_b^{11} E_{b,i}^1}{\sum_{j \neq 1} G_b^{1,j} E_{b,i}^j + \sigma^2}\right) f_{b,i}$$

$$\text{Subject to} \sum_{b=1}^{B} \sum_{i=1}^{M} \log\left(1 + \frac{G_b^{kk} E_{b,i}^k}{\sum_{j \neq k} G_b^{kj} E_{b,i}^j + \sigma^2}\right) f_{b,i} \geq R_{target,k} \quad k \neq 1$$

$$E_{b,i}^k = \begin{cases} P_{on}^k & \text{if } \phi_{b,i}(k) = 1 \\ 0 & \text{otherwise} \end{cases}$$

$$\sum_{b=1}^{B} \sum_{i=1}^{M} E_{b,i}^k f_{b,i} \leq \frac{P^k}{BS}, \forall k$$

$$\sum_{i=1}^{M} f_{b,i} = 1 \; \forall b$$

$$0 \leq f_{b,i} \leq 1 \; \forall b, i$$

in the case that the user rate is the minimum of the rates of all the users, each of the time sharing parameters corresponding to each of the transmission patterns is given by:

Maximize $r_0$ $$\text{Subject to} \sum_{b=1}^{B} \sum_{i=1}^{M} \log\left(1 + \frac{G_b^{kk} E_{b,i}^k}{\sum_{j \neq k} G_b^{kj} E_{b,i}^j + \sigma^2}\right) f_{b,i} \geq r_0$$

$$E_{b,i}^k = \begin{cases} P_{on}^k & \text{if } \phi_{b,i}(k) = 1 \\ 0 & \text{otherwise} \end{cases}$$

$$\sum_{b=1}^{B} \sum_{i=1}^{M} E_{b,i}^k f_{b,i} \leq \frac{P^k}{BS}, \forall k$$

-continued $$\sum_{i=1}^{M} f_{b,i} = 1 \quad \forall b$$

$$0 \le f_{b,i} \le 1 \quad \forall b, i$$

where, $E_{b,i}^{k}$ is transmit power of the kth user in the ith transmission pattern in the bth group of sub frequency band;

$G_b^{kk}$ is the transmission coefficient of the kth user in the bth group of sub frequency band;

$G_b^{kj}$ (j≠k) is the crosstalk coefficient of the jth user to the kth user in the bth group of sub frequency band;

$f_{b,i}$ are the time sharing parameters of the groups of sub frequency band;

$\phi_{b,i}$ is the ith transmission pattern in the bth group of sub frequency band, wherein M transmission patterns are set in each group of sub frequency band, and $\phi_{b,i}$ is a vector, the length of which equals to the number of the users and each element of which corresponds to a user;

$P_{on}^{k}$ is transmit PSD of the kth user;

$P^k$ is a limitation on the total power of the kth user;

$\omega$ is a weight coefficient of rate of the kth user;

$\sigma^2$ is power of the noise;

BS is the number of sub frequency bands contained in each group of sub frequency band;

$E_{b,i}^{1}$ is transmit power of the new user in the ith transmission pattern in the bth group of sub frequency band; similarly, the above parameters in which k equals to 1 are the parameters corresponding to the new user;

$r^0$ is the minimum of the rates of all the users, $r_0 = \min(R_k)$.

12. The method of claim 11, wherein the values of the three parameters, $G_b^{kk}$, $G_b^{kk}$(j≠k) and $\sigma^2$, are selected from the group consisting of the parameters corresponding to any sub frequency band in the group of sub frequency band, and the averages of the parameters corresponding to all the sub frequency bands in the group of sub frequency band.

13. A device for determining transmit power spectral density (PSD), comprising:
a calculation module, configured to calculate time sharing parameters corresponding to transmission patterns for all users in each frequency band; and
a PSD determining module, configured to determine transmit PSD according to the transmission patterns and the time sharing parameters.

14. The device of claim 13, further comprising:
a setting module, configured to set the transmission patterns for all users in each frequency band, and set initial transmit PSD and a PSD adjusting value;
wherein the PSD determining module calculates the time sharing parameters corresponding to the transmission patterns in each frequency band according to the initial transmit PSD set by the setting module subject to that the user rate is maximized and the total power of each user does not exceed a limitation; calculates an initial user rate according to the time sharing parameters calculated; adjusts the initial transmit PSD for τmax times according to the PSD adjusting value set by the setting module; in response to each adjustment, calculates a mid time sharing parameter corresponding to each transmission pattern in each frequency band according to the adjusted transmit PSD subject to that the user rate is maximized and the total power of each user does not exceed the limitation; calculates a mid user rate according to the mid time sharing parameter calculated corresponding to each of the transmission patterns; selects a maximum of the calculated τmax+1 rates of the users, and uses time sharing parameters corresponding to the transmission patterns subject to the maximum as the time sharing parameters corresponding to the transmission patterns.

15. The device of claim 13, further comprising:
a time sharing solution to frequency sharing solution conversion module, configured to convert transmit PSD in time sharing solution into transmit PSD in frequency sharing solution.

* * * * *